United States Patent [19]
Nevo et al.

[11] Patent Number: 6,055,480
[45] Date of Patent: Apr. 25, 2000

[54] ENVIRONMENTAL MONITORING SYSTEM

[75] Inventors: Igal Nevo, Bala Cynwyd; Maher Salah, Philadelphia, both of Pa.; Srinivas S. Dagalur, New Brunswick, N.J.; Mark Newman, Philadelphia, Pa.

[73] Assignee: Albert Einstein Healthcare Network, Philadelphia, Pa.

[21] Appl. No.: 08/967,124

[22] Filed: Nov. 12, 1997

[51] Int. Cl.$^7$ .................................................. G06F 169/00
[52] U.S. Cl. .............................................................. 702/3
[58] Field of Search ........................................ 702/3, 4, 5

[56]          References Cited
          U.S. PATENT DOCUMENTS 5,798,923   8/1998   Laskowski ..................... 702/5

OTHER PUBLICATIONS

Valent et al., "Abyssal Seafloor Waste Isolation: Environmental Report", Report NRL/MR/7401—95–7576, Naval Research Laboratory, Stennis Space Center, MS, 39529–5004, Sep. 29, 1995, pp. I–vii, 133–188, 460–475.

*Primary Examiner*—Donald E. McElheny, Jr.
*Attorney, Agent, or Firm*—Dann Dorfman Herrell and Skillman, P.C.; John S. Child, Jr.

[57]          ABSTRACT

An apparatus and method for monitoring environmental conditions that processes information to create and display information concerning changes in the status of environmental conditions. The apparatus comprises a means of transforming measured values of more than one parameter of the condition using a function dependent on at least one of the baseline and critical values of the conditions. In a preferred form, the function is a non-linear transformation function. The apparatus further includes mapping values for mapping the function to a sequence of reference values and generating a deviation indicator for each parameter. The deviation indicators are then analyzed to generate and display information concerning the changed status of the environmental (i.e., meteorological or geological) conditions.

27 Claims, 6 Drawing Sheets

ENVIRONMENTAL MONITORING SYSTEM

FIELD OF THE INVENTION

The present invention relates generally to methods and a related apparatus for monitoring environmental changes. More specifically, the invention relates to a system for the monitoring and subsequent analysis of environmental changes such as in weather and geological conditions including long term trends in an effort to evaluate and possibly avoid or ameliorate future adverse developments.

BACKGROUND OF THE INVENTION

Changes in the environment, such as the weather, can dramatically affect human well-being. Weather conditions determine a wide range of activities, courses of action, etc. Such conditions shape decisions by farmers regarding which crops to plant and what cultivating strategies should be employed during the growing season to ensure the best crop production. Humidity, precipitation, temperature, wind speed and sunlight are all weather conditions that vary and directly determine the success or failure of a given crop.

The earth's geology including, for example, soil conditions also undergo changes of both a long term and short term nature. Soil conditions such as moisture content, pH, mineral content, content of other inorganic and organic matter, temperature and other conditions or parameters all vary over time and directly affect not only the type of plants that will grow but also directly affect the well-being of persons and animals living there as well. Earthquakes and volcanoes are also examples of geologic conditions although they are more intense, short term and destructive.

Geologic conditions also affect plant and animal growth in a given area. Conversely, geologic conditions such as the chemical makeup of soil are also affected by what crops are grown therein as well as by the topography of the area which may result in soil erosion.

Changes in any of these environmental conditions, either short term or long term will ultimately affect the quality of life in the region undergoing change either for better or worse. Farming in particular is affected by atmospheric and geologic changes notwithstanding the fact that the change is gradual over a long term. More specifically, soil characteristics such as the nitrogen cycle, pH, moisture content, content of organic and inorganic matter and the like are all conditions which, if fundamentally changed over time may have dramatic consequences for crop growth regardless of how fast the change occurs.

An object of the present invention is to provide a method and an apparatus for monitoring, analyzing and comparing one or multiple changes in environmental conditions for any predetermined time period. In the event that any adverse environmental trend or pattern of change is detected by the apparatus, corrective measures can be taken to address the trend and possibly avoid the detrimental result.

Computer systems and methods utilizing systems for monitoring and analyzing data conditions from various sources are well known in the art. Seismographs for example, are well known sensors for the detection of tremors below the earth's surface and seismographic data may give some advance warning as to where and when an earthquake might occur. Similar devices can also be used to monitor active volcanoes to indicate subsurface geologic activity which may later result in a volcanic eruption. Seismographs however, are only able to detect geological change of such magnitude that is indicative of an imminent earthquake or volcanic eruption. This data does not provide a great deal of time to allow for remedial action to protect against the destructive forces inherent in the earthquakes or volcanic eruptions.

U.S. Pat. No. 4,796,639 to Snow et al. discloses a pulmonary diagnostic system in which a computer records and stores lung physiology data and compares the recorded values with expected norms. This can then be used to immediately sense and/or predict pulmonary problems or early signs thereof for preventive treatment.

U.S. Pat. No. 4,834,107 to Warner discloses and claims a non-invasive method for determining heart-related parameters in patients. The apparatus measures a number of physiological changes such as pulse, blood pressure, peripheral resistance, systolic and diastolic pressure, cardiac output and the like. This data is evaluated using a mathematical formula. The evaluated data is indicative of the state of the system and when the system falls outside the healthy norm. This can then be used to predict the likelihood of future problems in the patient.

U.S. Pat. No. 5,355,889 to Nevo et al. discloses a patient monitoring system which collects and analyzes a plurality of different medical conditions derived from a human subject. This system is particularly useful in the monitoring of the bodily functions of a patient under anesthesia during surgery. The system monitors the conditions and analysis using a sigmoid function indicative of normal and critical levels of that condition. A comparison of maximum and minimum functional values with a baseline value produces a vital function status indicator which not only provides a reasonable assessment of the patient's condition, but also what parameters, if any, are responsible for a patient's deteriorating health.

U.S. Pat. No. 5,465,308 to Hutcheson et al. discloses and claims a pattern recognition system comprised of a software program and method for its use which utilizes a neural network implementation to recognize the similarity of information received compared to that stored in a database. Two dimensional images are subjected to Fourier Transformation to yield a power spectrum. From this spectrum output vectors are generated which are statistically analyzed to determine any correlations between known patterns of data stored and incoming data. Whereas the main function is the matching of facial patterns, other applications are indicated as being possible.

Copending U.S. patent application Ser. No. 08/652,015 relates to an apparatus and method for monitoring the performance of a financial security or stock market wherein a large amount of data can be consolidated in a form sought by the operator for use for assessing the condition of that security or financial market.

Copending U.S. patent application Ser. No. 08/647,396 U.S. Pat. No. 5,772,599, relates to an apparatus and method for monitoring a system. Individual measured parameters related to the system are transformed to generate one or more status indicators. (The transformation maps each parameter into numbers representing the state of each parameter relative to the system's homeostatic conditions and to prescribed maximum and minimum reference values for each parameter.) The status indicators provide the operator with information for assessing the overall status of the system.

SUMMARY OF THE INVENTION

The present invention is an apparatus and method for long and short term analysis of environmental conditions and, in particular, for the analysis of any changes and/or deviations from a pre-determined norm. Meteorological and geological data are collected for the environmental conditions. The status of one or more environmental conditions may be monitored and employed by the operator to develop a quantifiable indicator based upon a baseline value. The indicator discloses significant changes in the long and short term status of the environmental conditions including changes that could, for example, adversely affect plant growth. Based on these indicators, the operator can then determine an appropriate action to undertake to try to address the possible consequences in environmental conditions whether harmful or beneficial.

BRIEF DESCRIPTION OF THE DRAWINGS

The foregoing summary, as well as the following detailed description of the preferred embodiments of the present invention, will be better understood when read in conjunction with the accompanying drawings, in which.

DETAILED DESCRIPTION OF THE INVENTION

The environmental conditions are measured and used to provide index values representing the normal value for that condition and various deviations from the normal conditions. The index values and the status indicators generated from the evaluations of the data generated for the selected environmental conditions can have a wide application to a number of fields such as agronomy, geology, forestry, long range weather forecasting, hydrology, animal husbandry and the like.

The conditions existing for a particular aspect of the environment are varied and may be monitored and analyzed separately or together as a whole. A farmer, agronomist or geologist can therefore obtain index values for a wide variety of such environmental conditions that affect the growth of crops or even presence of certain precious metals in the soil. Meteorological conditions suitable for such an analysis include amounts of precipitation (rainfall, snowfall and ice) for a given period of time, humidity, temperature ranges, sunlight for a given time period, barometric pressure values over time, average wind velocities, and the like. Agricultural applications would include many, if not all, of the last referenced meteorological factors plus a number of specific conditions pertaining to the soil. These conditions include temperature and moisture values, soil pH values, soil nitrogen content (nitrites, nitrates), inorganic chemical content, organic chemical content, and herbicide/insecticide chemical content. In addition, the inter-relationships between various conditions may be a subject for analysis. For example, a higher temperature over a given time period may result in a lower soil moisture content. Similarly high pH values may affect the presence of lower soil nitrogen content.

Soil conditions are generally dynamic and are capable of a considerable degree of change. Soil conditions are also a factor which can be treated if the apparatus of the invention informs the operator for changes in the condition(s) that affect the utility of the soil. For example, in more densely populated regions, pollutants or herbicides are more apt to leach into the soil. Similarly, soil quality may be diminished by erosion. Variable climates may result in great fluctuations in soil temperature.

The method and apparatus of the invention can also be used to monitor geological conditions in order to forecast more accurately the likelihood of future earthquakes, tremors and volcanic eruptions, and even to uncover valuable mineral deposits. In one preferred embodiment, seismometers are used to detect movement within the earth and relay the data to the claimed system for analysis as explained in the following paragraph.

Frequently, prior to the onslaught of an earthquake or volcanic eruption, very weak surface waves or pulses are generated. If detected, the surface waves can give some indication of the onset of an earthquake. The intensity of these surface waves can be monitored and analyzed by the method of the present invention. The deviation of these waves from a pre-determined norm can be expressed as an index value which could be used to give some indication of the likelihood of the occurrence of a more-powerful geologic shift. In other words, by monitoring seismic activity at these very low intensities and across several sensors at these very low intensities, the deviation from the norm can be used to predict the likelihood and location of later, greater shockwaves and the possible onset of an earthquake.

The method and system of the present invention may also be used in meteorological applications to monitor the amounts of precipitation, solar irradiation, temperature fluctuations and the like. The recorded data can be compared to those of an expected norm and can be defined in terms of index values representing levels of deviation from the norm. The index values can be used for example to determine whether precipitation is low for a given time of year and the amount of deviation from the norm. This index value helps in determining an appropriate response; for example the precise amount of irrigation or drainage to protect crops and the like. Long term precipitation and temperature may also be evaluated for deviations from the norm to detect climatic shifts that may occur over time.

Data for environmental conditions can be obtained from the daily or even hourly reports from weather bureaus, the National Geological Institute of Seismological Analysis, etc.

Environmental index values that are obtained for specific weather or geological conditions are preferably based on data obtained at a particular site of interest using the appropriate monitors, gauges and probes as will be discussed infra. As environmental conditions can be highly localized, such localized monitoring of the conditions provide more accurate information.

The last referenced index value for any atmospheric or geological condition may be used as a norm for the generation of a deviation indicator which represents the level of deviation from the last referenced value.

The method for monitoring change is also used for calculating specific index values of an environmental (i.e. meteorological or geological) condition of interest. These values can be transformed into a number of deviation indicators for different regions thus giving a better forecast of the present and expected environmental conditions by region.

These environmental conditions may be monitored and analyzed over a wide range of time periods. As noted above, the method and apparatus of the present invention can be used to monitor one environmental condition but is preferably used to monitor several conditions simultaneously. Environmental conditions that can be monitored include the specific meteorological/geological conditions identified.

Figure 1:
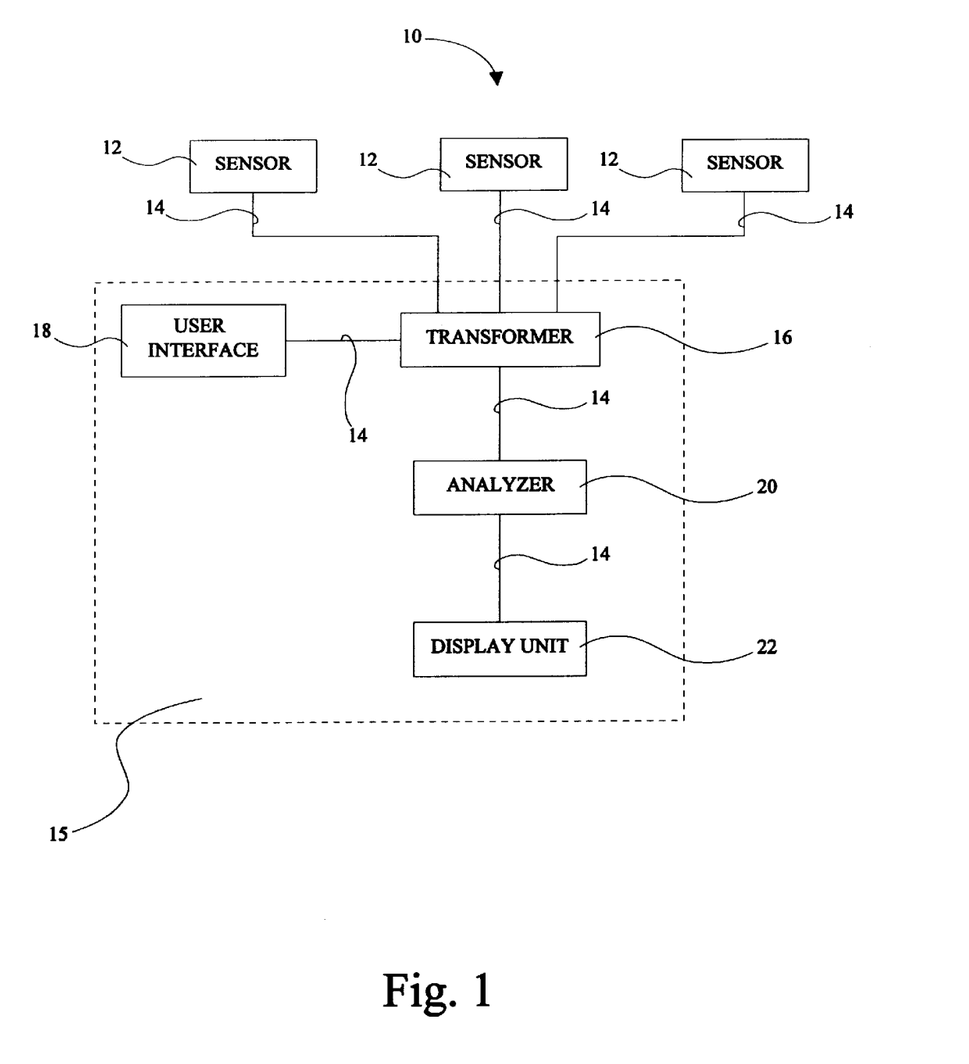
FIG. 1 is a schematic representation of an apparatus for analyzing a system in accordance with the present invention.

Referring now to FIG. 1, a system 10 for monitoring environmental conditions or parameters in accordance with the present invention is shown schematically. The system 10 comprises three sensors operatively connected to the system for measuring the values of three separate parameters associated with that system. However, the number and types of sensors 12 used will vary, depending upon the specific application.

Accordingly, the sensors 12 can comprise physical sensors or logical sensors, such as monitors, for measuring the values of a plurality of parameters associated with the system of interest. The sensor may be a component of a remote sensing station. Accordingly, the sensor can supply measured values to the remote sensing station in either a continuous mode or on demand. Further, the sensor or the remote sensing station may be provided with data storage means, such as a computer readable disk, for storing the values measured by the sensor so that the values can be processed at a later time.

The measured values of the parameters are then transferred to a processor 15 across one or more signal lines 14. In one embodiment, the monitors 12 are interfaced to the processor 15 using a data communication link. The processor 15 can comprise a single stand-alone unit or it can be linked to a network using client/server architecture. In one embodiment, the processor 15 comprises a PC Pentium desktop platform using a UNIX or Windows NT operating system. Further, the processor 15 is developed as an object oriented implementation in the C++ language. The processor 15 uses an Ethernet Network card and runs TCP/IP communication protocol. Cables or wireless communication devices are used for the network connectivity.

The processor 15 optionally comprises a user interface 18 for transferring a system profile to the transformer 16 across a signal line 14. Preferably, the user interface 18 also includes a computer keyboard so that the operator can directly input information to the transformer 16. The graphical portion of the user interface 18 can be developed using an OSF/MOTIF Toolkit. Alternatively, the system profile can be stored in a form which can be accessed by the transformer 16. The system profile supplied to the transformer 16 comprises information about the baseline, minimum, and maximum values of each of the parameters. Identifying information about a system (i.e., system type, operator's name, identification number, time, date, etc.) can also be provided.

The processor 15 also comprises a transformer 16 which takes the measured values of each environmental condition or parameter and generates a deviation indicator for each parameter. The transformer 16 assigns to each environmental parameter a deviation indicator which represents the level of performance associated with the parameter. In one embodiment, each environmental parameter is assigned one of six levels of deviation, ranging from zero to five representing categorical numbers or levels or states of being according to the following scale:

0—(color of display background) No deviation from baseline
1—(white-yellow) minimum
2—(yellow) mild
3—(orange-yellow) moderate
4—(orange) severe
5—(red) very severe Accordingly, the transformer maps each parameter into numbers representing the state of each parameter relative to the system's baseline condition and to prescribed maximum and minimum reference values for each parameter.

The individual deviation indicators are then transferred across a signal line 14 to an analyzer or comparator 20. The analyzer 20 compares the values of the deviation indicators to one another and generates one or more status indicators. The status indicators contain information regarding the overall status of the environmental systems of interest.

A display unit 22 is provided for communicating the environmental status indicators to the user. The display unit 22 is connected to the analyzer 20 by a signal line 14 which allows the status indicators to be passed from the analyzer 20 to the display unit 22. Preferably, the display unit 22 comprises a video monitor so that the environmental status indicators can be visually displayed in a form that is easily analyzed by the user. Optionally, an audio-signal indicator is also generated that has different sounds for each level of deviation.

Figure 2:
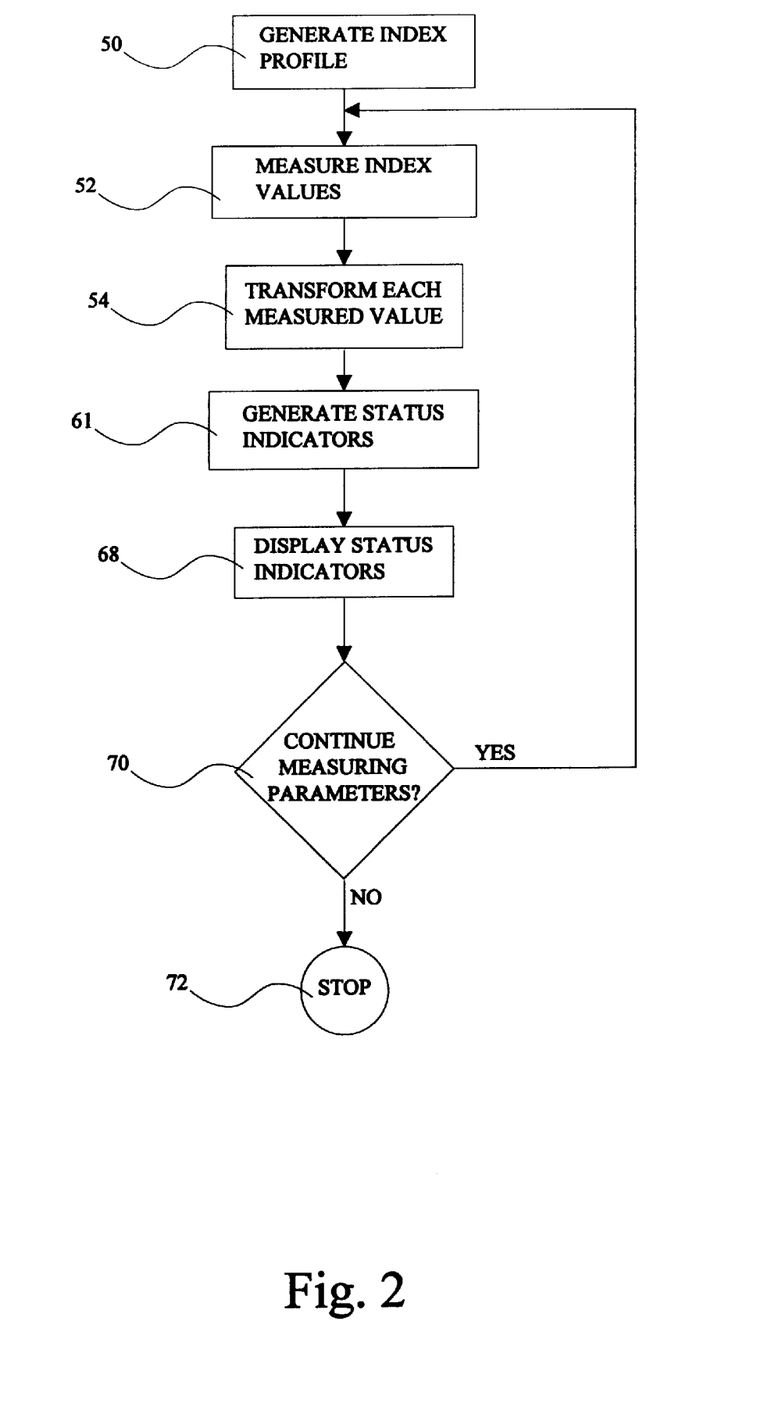
FIG. 2 is a flow chart showing the steps involved in a method for analyzing a system in accordance with the present invention.

The present invention also relates to a method for monitoring an environmental condition as depicted in FIG. 2. According to the method, an index profile is generated at step 50. The user is given an option of either creating a new profile or recalling an old one. If a new profile is to be created, the user inputs the information regarding the profile for the environmental condition to be monitored. For many applications, such information includes a baseline, a minimum, and a maximum value for each environmental condition. If, however, an old index profile is to be used, the operator is preferably given an option to adjust the existing profile. The method of the present invention allows the operator to tailor the index profile to the specific conditions to be analyzed.

Once the environmental index profile has been generated, the individual environmental (i.e., meteorological/geological) index values are measured, as shown at step 52. The number of environmental (i.e., meteorological/geological) index values measured will vary depending upon the application. However, the method of the present invention can be employed for the measurement of any number of environmental index values.

At step 54 the measured value of each environmental index value is transformed to yield a deviation indicator for each value. The measured values are mapped into a corresponding deviation indicator using a transformation function. In a preferred form, the transformation function is asymmetric about the environmental baseline value. In one embodiment, the transformation is a function which exhibits a maximum sensitivity for deviations close to the baseline value, which is expressed in an alternative to the sigmoid function, namely $$y = \tfrac{1}{2}\{1 - \exp(-G(x-BL)^2)\},$$

wherein y represents the mapped value of the parameter, x represents the measured value of the parameter, BL represents the baseline value for the parameter, and G represents the mapping parameter such that $$G_{low} = \frac{-\ln(1 - 2y')}{(x_{min} - BL)^2} \text{ for } x < BL$$

and $$G_{high} = \frac{-\ln(1 - 2y'')}{(x_{max} - BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter. However, the present invention can also be practiced using transformation functions which exhibit a minimum sensitivity for deviations close to the baseline value of the environmental index value.

Figure 3:
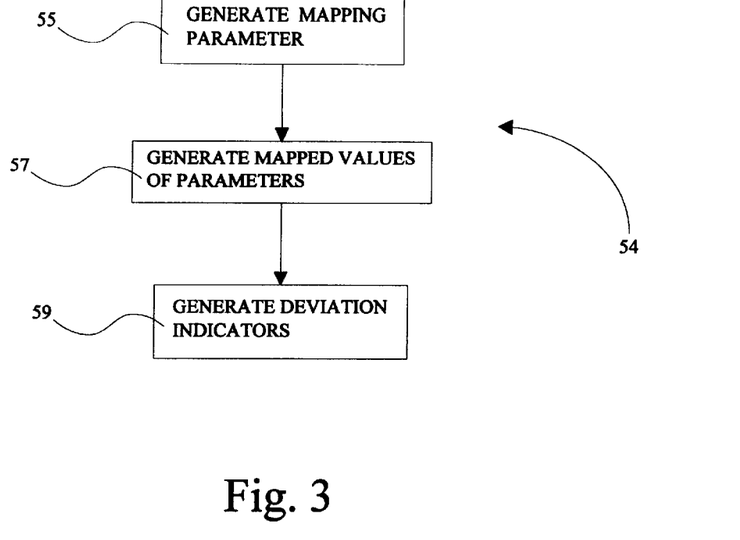
FIG. 3 is a flow chart showing the steps involved in transformation step 54 of FIG. 2.

The process for transforming each measured value into a deviation indicator, step 54, is shown in greater detail in FIG. 3. A mapping parameter for a particular environmental factor is generated for each environmental parameter at step 55. The form of the mapping parameter is determined by the function used to effectuate the transformation. The mapping parameter reflects the information regarding each parameter which was generated as part of the system's index profile at step 50. Preferably, the mapping parameter is different for values of the parameter above the environmental baseline value and below the baseline value.

Once the value of the mapping parameter for each factor has been determined, the mapped values of the parameters are generated at step 57. The mapped values are generated using the transformation function and the appropriate value for the mapping parameter for each factor.

The mapped value of each environmental parameter is then used to generate the deviation indicator for each parameter at step 59. The deviation indicator is determined by assigning to each parameter a level of deviation associated with the parameter. Preferably, the higher the mapped value, the higher the level of deviation. As stated before, each mapped value is preferably assigned one of six levels of performance, ranging from zero to five according to the following scale:

0—(color of display background) no deviation from baseline
1—(white-yellow) minimum
2—(yellow) mild
3—(orange-yellow) moderate
4—(orange) severe
5—(red) very severe In one particular embodiment, the transformation is based on the well known sigmoid function. Baseline values that may be used for the purpose of this invention include, but are not limited to, the environmental factors identified above. The operator is free to select any baseline value of interest. However, the transformation is identically performed for all parameters; only the baseline and maximum and minimum values are changed.

The operator is given the option to either create a new profile for the environmental condition or to recall an old one. To apply the function, there is a need to use three parameters; the baseline value, the minimum value and the maximum value.

The minimum and maximum deviation from the baseline may be set according to the defined values. For example, for evaluation of temperature, the high and low temperatures of the previous day or even the previous year can be employed. In any event, the values may be defined by the operator. For example, baseline values may be mapped to a value of 0.5. In this case, when the parameter (e.g., temperature) rises above the baseline value, it can be mapped to a value above 0.5 and below 1.0; values below baseline are then mapped to values below 0.5 and above 0.0.

Thus, the transformation maps the parameter or temperature into numbers representing the state of the parameter relative to the temperature at a selected moment and to prescribed maximum, minimum, and baseline reference values for that parameter.

The basic equation for the sigmoid function employed in this embodiment is as follows:

$$f(x) = \frac{1}{1 + e^{-G(x-BL)}}$$

where BL is the baseline value for parameter x of the stock of interest x for which the function f(x) is equal to 0.5 when x=BL. In general, it is preferable to choose the midrange of the sigmoid function as the baseline. The parameter G is determined on the basis of the desired value of f(x) for some other value of x. G is determined by the equation:

$$G = \frac{-\ln\left(\frac{1}{f(x)} - 1\right)}{(x - BL)}$$

According to one embodiment of the present invention, the value of G for all functional values below baseline and the value of G for all functional values above the baseline are derived by setting x equal to its minimum and maximum values, respectively, and mapping these values to values for f(x) of 0.1 and 0.9. (There will only be one value of G if the baseline value is centered between the maximum ($x_{max}$) and minimum ($x_{min}$) values). For any parameter x, the maximum and minimum values are typically known. Therefore, given the baseline value BL of any parameter, the following values are determined:

$$G_{low} = \frac{-\ln\left(\frac{1}{0.1} - 1\right)}{(x_{min} - BL)}$$

$$G_{high} = \frac{-\ln\left(\frac{1}{0.9} - 1\right)}{(x_{max} - BL)}$$

Accordingly, $G_{low}$ and $G_{high}$ may be determined and thereafter used to determine the value of f(x) in real time in accordance with the following equations:

$$f(x) = \frac{1}{1 + e^{-Glow(x-BL)}} \text{ for } X \leq BL$$

$$f(x) = \frac{1}{1 + e^{-Ghigh(x-BL)}} \text{ for } X > BL$$

A similar transformation may be performed upon every parameter measured by the system, since there is a corresponding value of $G_{low}$, $G_{high}$ and BL for every parameter.

The values of f(x) for each parameter x is then used to generate the deviation indicator for each parameter using an equation of the form:

$$DI = \lfloor K \times \text{Abs}(y - 0.5) \rfloor$$

wherein DI represents the deviation indicator, Abs represents absolute values, K represents a constant, y represents the value of the function, and "$\lfloor \, \rfloor$" represents a floor function that returns the largest integer value of an expression contained between the "$\lfloor$" and the "$\rfloor$" symbols.

The use of the sigmoid function as described above provides several advantages. First, the transformation provides maximum sensitivity (or gain) for parameter values (x) near the parameter's baseline value. Therefore, the value of f(x) will change most rapidly when the measured value of parameter x first begins to move away from the baseline value and will change least rapidly when the value of the parameter is far away from its baseline value. In addition, the data needed to calculate or recalculate the transformed data can be easily and quickly determined. The system may advantageously be programmed such that the baseline profile data may be modified on line. In this case, the system will be adaptable to any environmental condition (i.e., a tornado). The maximum and minimum values could also be modified on line.

In another embodiment, the equation used to transform the measured values of the indices to the deviation indicators is of the following form:

$$y = \frac{1}{2}\{1 - \exp(-G(x - BL)^2)\},$$

wherein y represents the mapped value of the parameter, x represents the measured value of the parameter, BL represents the baseline value for the parameter, and G represents the mapping parameter.

The mapping parameter, G, is determined by solving the above equation. Accordingly, the mapping parameter is given by an equation of the form:

$$G = \frac{-\ln(1 - 2y)}{(x - BL)^2}.$$

The mapping parameter, G, is then solved for two ranges of the parameter, x. The first range corresponds to values of x when x<BL and the second range corresponds to values of x when x≥BL. Alternatively, the first range corresponds to values of x when x≤BL and the second range corresponds to values of x when x>BL. Accordingly, the two values of the mapping parameter corresponding to the two ranges are given by the following equations:

$$G_{low} = \frac{-\ln(1 - 2y')}{(x_{\min} - BL)^2} \text{ for } x < BL$$

and $$G_{high} = \frac{-\ln(1 - 2y'')}{(x_{\max} - BL)^2} \text{ for } x \geq BL$$

wherein y' represents the value of the function at $x_{min}$, $x_{min}$ represents the minimum value of the parameter, y" represents the value of the function at $x_{max}$, and $x_{max}$ represents the maximum value of the parameter.

Once the values of the mapping parameter, G, for the two ranges have been determined, the mapped value of the parameter is generated using an equation of the form:

$$y = \frac{1}{2}\{1 - \exp(-G_{low}(x - BL)^2)\}, \text{ for } x < BL$$

$$\frac{1}{2}\{1 - \exp(-G_{high}(x - BL)^2)\}, \text{ for } x \geq BL$$

For each parameter, the measured value of the parameter, x, is plugged into the above equation, along with the appropriate baseline value, BL, and mapping parameter, G. Accordingly, a mapped value of each parameter, y, is generated.

The mapped value of each parameter, y, is then used to generate the deviation indicator for each parameter using an equation of the form:

$$DI = \lfloor K \times y \rfloor$$

wherein DI represents the deviation indicator, K represents a constant, y represents the value of the function, and "$\lfloor \, \rfloor$" represents a floor function that returns the largest integer value of an expression contained between the "$\lfloor$" and the "$\rfloor$" symbols.

Returning to FIG. 2, once the deviation indicators have been determined for each parameter, the deviation indicators are analyzed to generate one or more performance or status indicators at step 61. The status indicators contain information about the overall status of the system. The status indicator may be a scale or bar that signifies the relative volatility of the environmental condition in terms of its deviation from the overall group's baseline. In a preferred embodiment of the invention, the condition's indicator is assigned one of six values, from zero to five. Zero represents stability and five represents either a rise or fall. On the display, the area representing each rise or fall increases as the level gets further from the baseline (i.e.,the gain or sensitivity of the transformation increases as the measured parameter moves away from its baseline level). The transformation is performed on every parameter, therefore there is an assigned level for each parameter.

The value of the status indicator is taken to be the maximum level of the transformed parameters be this in terms of negative deviation or positive deviation. The status indicator is assigned a performance or value level by comparing the indicator to prescribed reference values. Exemplary reference values are shown in the following table.

0—(color of display background) no deviation from baseline
1—(white-yellow) minimum
2—(yellow) mild
3—(orange-yellow) moderate
4—(orange) severe
5—(red) very severe The above reference values may be adjusted to meet specific parameters and analysis thereof for each environmental condition or conditions.

Figure 4:
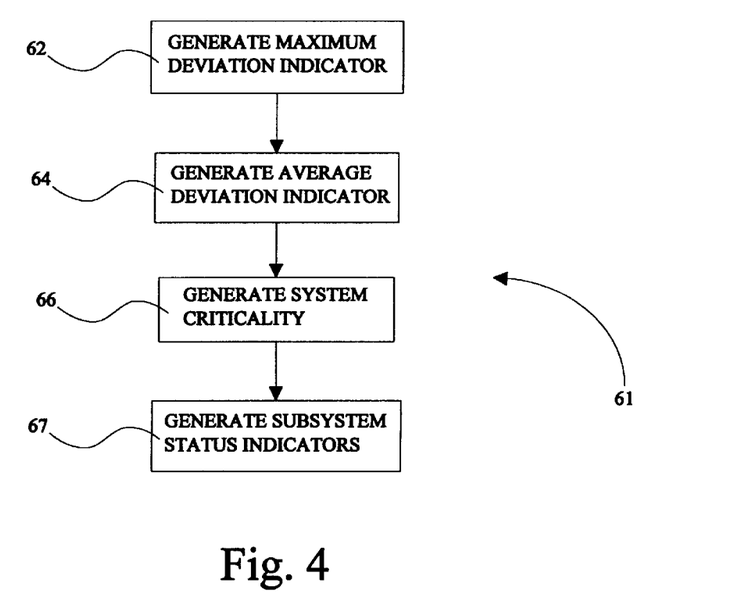
FIG. 4 is a flow chart showing the steps involved in comparison step 61 of FIG. 2.

The steps involved in generating the status indicators at step 61 are shown in more detail in FIG. 4. A maximum deviation indicator is determined at step 62 using an equation of the form:

$$DI_{max} = \max\{DI_i | i = 1, \ldots, n\}$$

wherein n is the total number of parameters being measured and max{ . . . } is a function which returns the maximum value of the elements enclosed between the "{" and the "}".

In addition, an average deviation indicator is determined at step 64 using an equation of the form:

$$DI_{avg} = \frac{1}{n}\sum_{i=1}^{n} y_i$$

wherein $y_i$, is the mapped value of the $i^{th}$ parameter and n is the total number of parameters being measured.

Further, system criticality is determined at step 66 using an equation of the form:

$$DI_{cri} = \frac{n_m}{n}(DI_{max} - DI_{avg}) + DI_{avg}$$

wherein $n_m$, is the total number of parameters with a deviation indicator, DI, equal to $DI_{max}$.

Another feature in accordance with the present invention is that the measured environmental (i.e., meteorological/geological) index values or parameters are grouped according to subsystems of several environmental conditions. As an example, rainfall and snowfall may be combined into a subsystem. In some applications, the same meteorological/geological index value or parameter can be grouped in more than one subsystem. One or more subsystem performance or status indicators associated with each subsystem are then generated at step 67 of FIG. 4 by analyzing the deviation indicators for the measured parameters which are grouped in each subsystem. The subsystem performance indicator becomes the largest deviation indicator of all the parameters grouped in that subsystem. For example, rainfall amounts in 10 locations (numbers 1–10) are monitored. Of those regions, locations defined by numbers 1 and 4–7 may be in the same county and can therefore be grouped as a first subsystem. Similarly, location numbers 1 and 3–8 may be in the same state and grouped as a second subsystem. If the deviation indicators corresponding to the rainfall amounts of location numbers 1, 3 and 7–8 have a value of "1," and the deviation indicators corresponding to the rainfall amounts of locations 4–6 have a value of "2," the performance indicator of the system will be assigned "2." Additionally, the subsystem comprising the first group of locations will be assigned a subsystem performance indicator of "2" and the subsystem comprising the second group of locations will be assigned a subsystem performance indicator of "1."

Figure 5:
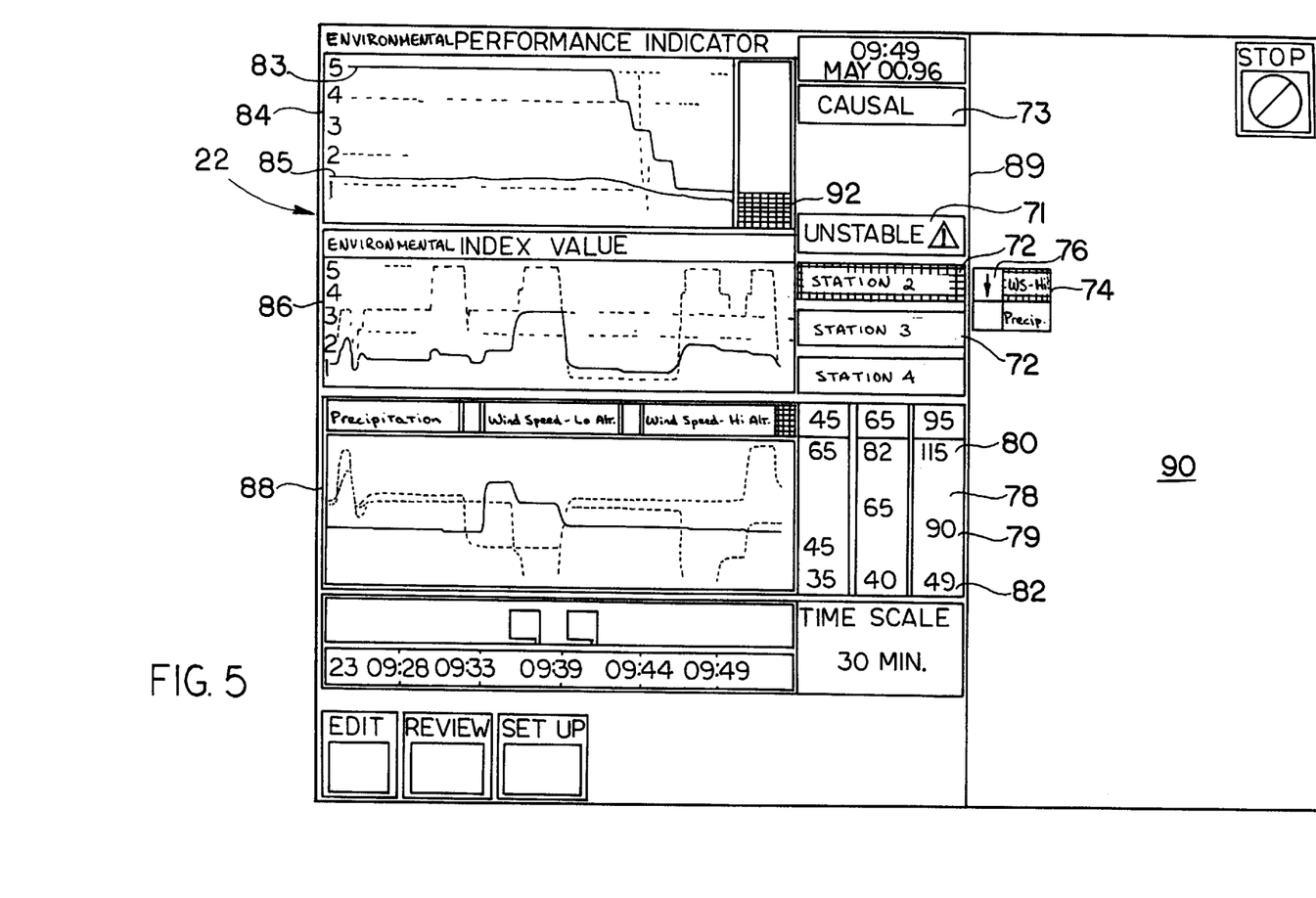
FIG. 5 is a view of a display in accordance with the present invention for analyzing any one of a number of environmental conditions indicating the performance of the condition of interest.
Figure 6:
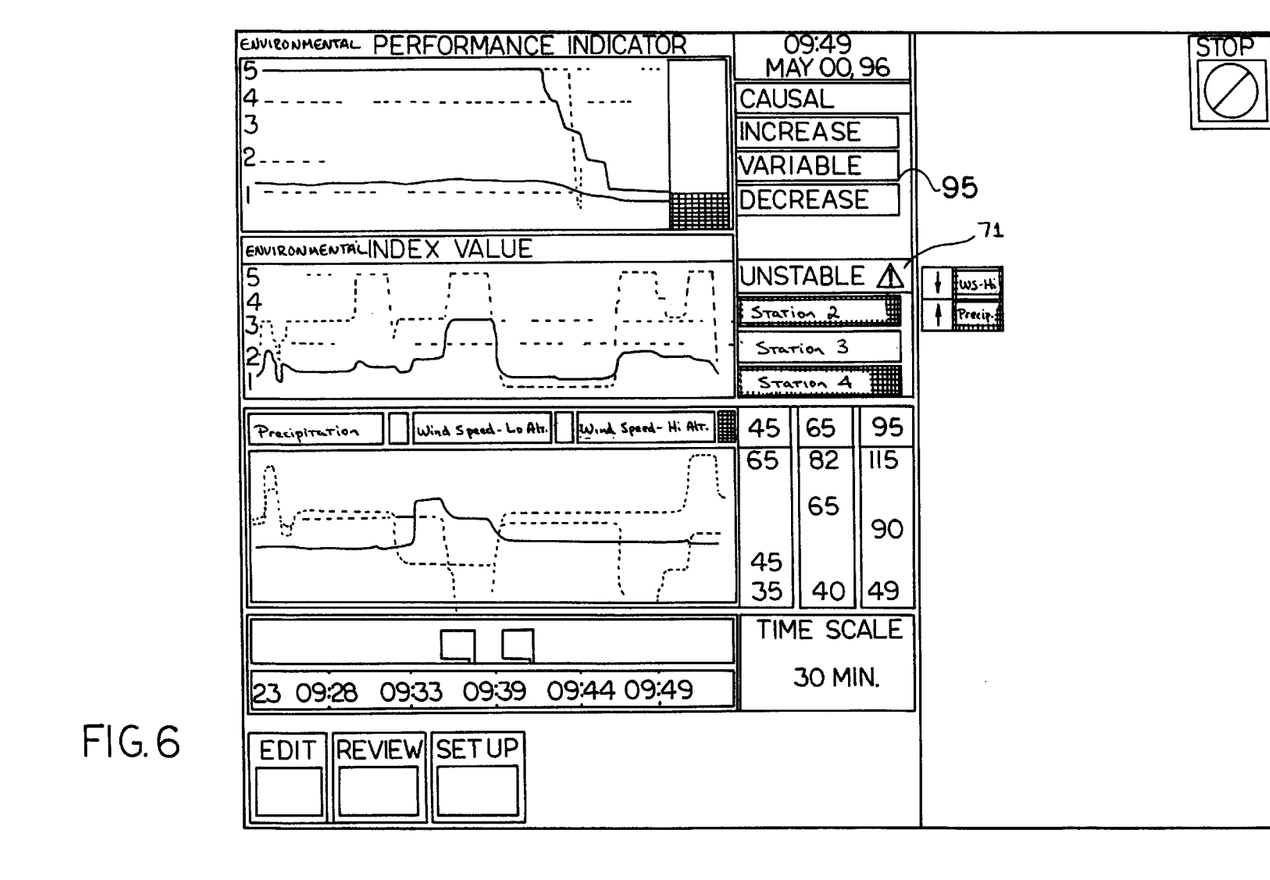
FIG. 6 is a view of the display in FIG. 5 wherein a second group of environmental conditions is shown indicating the performance of three specific conditions.

Returning to FIG. 2, after the status indicators have been generated at step 61, the status indicators are displayed in a display window at step 68. An example of the display window 22 for displaying the status indicators is shown in FIGS. 5 and 6, which are discussed below.

After the status indicators have been displayed at step 68, it is determined whether additional values for the parameters are to be measured at step 70. If additional values are to be measured, the method returns to step 52. However, if no additional values are to be measured, the method proceeds to step 72, where the method stops.

The performance indicator may be displayed along with an indication of the subsystems involved. Each subsystem, however, will be represented with its subsystem status or performance indicator, respectively "2" and "1." The advantage of this representation is to minimize the null space and eliminate ambiguity.

The true scope of the present invention is not limited to the transformation of the measured parameters to values ranging from zero to five, nor is the invention limited to the partition of the transform space into six value levels. Similarly, the invention may be carried out using a transformation other than the sigmoid transformation described herein (although the sigmoid is one preferred function). As indicated above, an advantageous feature of the sigmoid transform is that the transformed parameters can be directly compared with one another in determining the performance indicator. Other important features of the sigmoid transform is the maximum sensitivity (gain or slope) for parameter values near baseline and the ability to define the transform with only three variables ($G_{low}$, $G_{high}$, and BL). These variables can be memorized by the system and employed to transform the measured data in real time using relatively simple formulas. In addition, the sigmoid transform may be applied in a different manner (using a different value of G) for parameter values below and above the baseline value, which is advantageous in transforming parameters that may have baseline values skewed closer to the minimum value than to the maximum value, or vice versa. Any transformation with these or similar features may be employed in practicing the present invention.

Instead of the sigmoid function specified above, the measured environmental parameters may be normalized by utilizing other functions, such as:

$$y = \frac{1}{1 + e^{-G(x-BL)}}$$

$$y = \tanh(x)$$

$$y = \frac{x}{(1+x)}$$

$$y = \begin{cases} ax + b\sin w & |x| > |bw| \\ y_m & x > x_{max} \end{cases}$$

wherein x represents the value of the particular environmental index; BL represents the baseline value for the environmental index; $X_{max}$ represents a predefined maximum value for the environmental index; a, b, and w represent predefined numbers; and y represents the value of the function, and $Y_m$ represents a predefined maximum value of the function.

Following the method of the present invention, the operator can analyze changes in temperature or rainfall that are publicly known (i.e., reported in the news) or of personal knowledge alone (i.e., local measurements). The operator can also perform vertical or in depth analysis of specific environmental factors. Under certain circumstances, the data can be received on-line directly from an outside service, i.e., United States Weather Bureau.

Referring now to FIG. 5, the data received is processed within the on-line computer and displayed upon a video screen (22). The main screen (89) provides a horizontal information and data display (72, 84, 86, 88, and 92) for all the factors that the operator focuses on. The display at the top screen (84) contains general information about the current state of the environmental condition, (e.g., rainfall performance indicator (83) and an average rainfall performance indicator (85)). Adjacent to each environmental condition shown by the icon (72) is a space or window indicating the initials of the environmental condition whose performance is being monitored (74). The abbreviation indicates that the condition monitored is shown on the display. Clicking on another icon (72) will reveal other factors whose performance is being monitored.

Adjacent to the window (74) there is a space for an arrow indicating up or down (76). An upwards arrow indicates a rise in the condition and conversely a down arrow indicates a fall in the condition. The current measurement for the factor is displayed as a window, labeled with the name of the corresponding sensor or condition, that inherits one of the following six colors: color of display background, white-yellow, yellow, orange-yellow, orange and red.

0—(color of display background) no deviation from baseline

1—(white-yellow) minimum

2—(yellow) mild

3—(orange-yellow) moderate

4—(orange) severe

5—(red) very severe

There is an indication (not shown) of the difference between the current temperature and the previous day's high or low temperature. This difference is also in numbers and also inherits the color of the current temperature.

The system provides a global indicator (specific performance indicator) for an entire group of environmental conditions and reflects the individual changes of each condition and the direction of change. All these changes are indicated, using the 0–5 integer scale that indicates the maximum deviation of the entire group. The system also indicates the average deviation of the entire group using the continuous value on the 0–5 absolute value scale. This eliminates the virtual null space created by displaying the maximum deviation only. The environmental index values are revealed upon request by the operator. The reference values use the previous day's high and low values as the baseline value.

The baseline value (79) may be displayed. These environmental index values will be the same for all the conditions, i.e., all measurements of rainfall at different locations (horizontal analysis). In a preferred form, the values relate to significant environmental conditions (i.e., temperature, amount of rainfall, amount of sunshine, although values of lesser importance may be included at a later stage). The high (80) and low (82) boundaries or critical values may also be displayed respectively, on the screen (78) and these high and low critical values may be changed at the operator's will. The values shown on the screen (78) comprise the current referenced values and baseline.

The system can receive data on-line from weather services or a seismograph, or from any other on-line data source. The rate of update may be different contingent upon the rate of transmission of the data service.

Referring again to FIG. 5, the display provides access to different time intervals, for example, 15 minutes, 30 minutes, 1 hour, etc. In one preferred embodiment, comments and events are entered using the keyboard. For purposes of analyzing one condition, the system will provide access to the database without losing the view of the global indicator. As noted below, the system will provide a comparable display of other conditions either on the same window or on a separate window underneath the current window.

The main display (89) is divided into two main portions. On the right is an empty space (90) for interaction with the system while, the left section is the main information display (72, 84, 86, 88, and 92). The main subsection will include three windows. In this figure, the top window (84) includes the trend temperature and the average trend temperature indicators for the location being monitored. The middle window (86) indicates amount of rainfall. The lower window (88) allows the operator to focus on up to three other specific environmental conditions. In the middle of the screen lateral to the top window is a bar (92) that changes in height and color. The bar (92) reflects instantaneous changes in the environmental conditions. There are 6 different colors, one for each value. The bar changes in height according to the maximum deviation and inherits the color that corresponds to that level. This mode of presentation conveys the information in 2 dimensions, height and color. The purpose of the system is to convert the index values to information that will be perceived and comprehended by the operator at a glance.

In the center of the screen lateral to the bar there is a group of push buttons/icons (72) for each subsystem representing certain environmental conditions or a condition for a horizontal-type analysis or subsystems of conditions for a vertical-type analysis. These indicators assume the color of deviation that corresponds to the maximum deviation of the individual indicators or icons that are included in this segment or subsystem. The analysis of each segment is independent of all other analysis and can be carried out with the sigmoid function or other method discussed supra. Above the group of the push buttons/icons (72) there are two push buttons/indicators that will reveal the causal event (73) and the "unstable" icon (71). At the bottom of the screen there is a set of utility buttons that allow the operator to interact with the system. Clicking on one of the subsystem or condition push-buttons will reveal the individual icons, the color that indicates the degree of deviation, and an arrow that indicates whether the deviation is increasing or decreasing.

In yet a further embodiment of the present invention, in addition to the unstable icon (71), the display can include three push button indicators or icons (95), shown in FIG. 6, which will reveal three additional sets of environmental parameter index values. A first functional icon when activated will display all the parameters for the environmental conditions of interest being observed. A second functional icon when activated summarizes for all the locations the conditions that are changing or variable for a given point in time. This is tantamount to the embodiment with the "unstable" icon (71) above. Finally, a third icon will present the conditions that are lower than their baseline value of yesterday, last week, etc., which provides an indication of the current trend of the environmental conditions.

Figure 7:
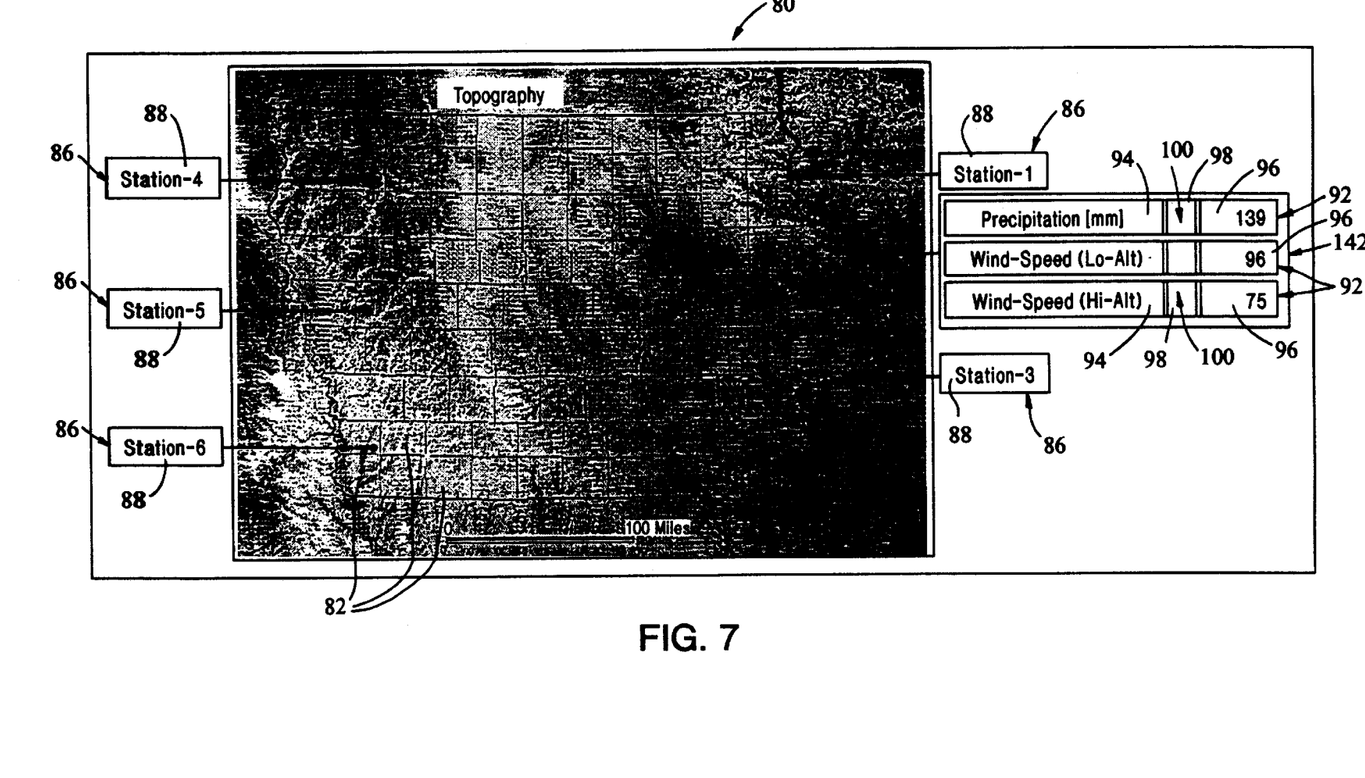
FIG. 7 is a view of a display in accordance with the present invention for showing the status of a geographic area being monitored for environmental conditions.

The screen 22 may also comprise a pictorial representation of the general system for graphically displaying information about the system, as shown in FIG. 7. In that figure, the pictorial representation 80 is that of a geographical map which is useful for monitoring weather systems. The pictorial representation 80 shows structures 82 representing individual counties, towns, and/or cities. A series of labels 86 are provided which identify the subsystems and/or sensors, as well as individual parameters associated with the system or data obtained from sensors. In a preferred embodiment, the labels 86 are shown to illustrate certain parameters, namely precipitation, wind speed at low altitudes, and wind speed at high altitudes, but other subsystems, sensors and/or parameters can of course be used in place of the referenced subsystems, sensors and/or parameters. Each label 86 comprises a brief descriptor 88 which informs the user of the subsystem/sensor or parameter being identified by the label 86. The background field of label 86 can be shaded to indicate the status of the subsystem/sensor or the parameter. When the label 86 identifies a subsystem and/or sensor, the shading reflects the value of the subsystem and/or sensor status indicator which indicates the degree of deviation associated with the subsystem and/or sensor. When the label 86 identifies a parameter associated with the general system, the shading reflects the value of the deviation indicator associated with that parameter. An up or down arrow may be displayed to indicate whether the subsystem and/or sensor deviation indicator has shifted above or below the baseline value for that subsystem and/or sensor.

When the label 86 identifies a subsystem and/or sensor, the user can be given the option to view the particular parameters which contribute to the status indicator of the subsystem and/or sensor. Accordingly, a parameter deviation display 142 for the parameters which are contributing to the subsystem and/or sensor status indicator can be displayed in place of, or alongside of, the label 86 associated with the subsystem and/or sensor. As shown in FIG. 7, three parameters, the precipitation, wind speed at low altitude, and wind speed at high altitude, contribute to the Station 2 sensor. Therefore, three display boxes 92 are provided corresponding to those three parameters. Each display box 92 comprises a descriptor 94 identifying the parameter, a measured value window 96 for displaying the measured value of the parameter, and a status window 98 indicating the degree of deviation associated with the deviation indicator for that parameter. The color of the descriptor 94 and the status window 98 may correspond to the degree of deviation associated with the deviation indicator for that parameter. An up or down arrow 100 may be displayed to indicate whether the deviation of the parameter has shifted above or below the baseline value for that parameter.

With regard to the subsystems, when the average deviation indicator for the subsystem illustrated in the pictorial representation 80 reaches a predetermined value, that subsystem is highlighted in the pictorial representation.

The present invention is intended to be an operator friendly system that may be specifically tailored to a particular environmental application for the monitoring of certain environmental conditions and may be coordinated so as to utilize many of the operators own means of interpreting the environment. As such, it is recognized that there are many variations and changes that may be made with respect to the embodiments set forth above. It is to be understood that to the extent any such changes or alterations do not materially change or alter the method of data transformation and analysis as set forth herein, such changes or alterations must be considered as falling within the spirit and scope of the invention as recited by the claims that follow.

What is claimed is:

1. An apparatus for monitoring variable environmental conditions in order to analyze any changes and/or deviations from a predetermined norm, said apparatus comprising,:
    a. transformation means for transforming each value of a plurality of environmental index values associated with the environment using a function dependent on at least baseline and critical values of the index value;
    b. mapping means for mapping the function to a sequence of reference values and generating a deviation indicator for each environmental index value; and
    c. analysis means for analyzing the deviation indicators and generating an average deviation indicator in order to analyze any changes and/or deviations from a predetermined norm.

2. The apparatus as recited in claim 1 wherein the analysis means generates an average deviation indicator employing a function of the form:

$$DI_{avg} = \frac{1}{n}\sum_{i=1}^{n} y_i$$

wherein $DI_{avg}$ represents the average deviation indicator, $y_i$, represents the mapped value of the $i^{th}$ value and n represents the total number of values being measured.

3. The apparatus as recited in claim 1 wherein the transformation means employs a function which exhibits a maximum sensitivity for deviations close to the baseline value of the environmental index value.

4. The apparatus as recited in claim 3 wherein the transformation means employs a function of the form:

$$y = \frac{1}{1 + e^{-G(x-BL)}}$$

$$y = \tanh(x)$$

$$y = \frac{x}{(1+x)}$$

$$y = \begin{cases} ax + b\sin w & |x| > |bw| \\ y_m & x > x_{max} \end{cases}$$

wherein x represents the value of the particular environmental index; BL represents the baseline value for the environmental index; Xmax represents a predefined maximum value for the environmental index; a, b, and w represent predefined numbers; and y represents the value of the function, and $Y_m$ represents a predefined maximum value of the function.

5. The apparatus as recited in claim 1 wherein the transformation means employs a function which exhibits a minimum sensitivity for deviations close to the baseline value of the environmental index value.

6. The apparatus as recited in claim 5 wherein the transformation means employs a function of the form:

$$y = \tfrac{1}{2}\{1 - \exp(-G(x-BL)^2)\},$$

wherein y represents the mapped value of the parameter, x represents the measured value of the parameter, BL represents the baseline value for the parameter, and G represents the mapping parameter such that $$G_{low} = \frac{-\ln(1 - 2y')}{(x_{min} - BL)^2} \text{ for } x < BL$$

and $$G_{high} = \frac{-\ln(1 - 2y'')}{(x_{max} - BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

7. The apparatus as recited in claim 1 wherein the transformation means employs a non-linear transformation function.

8. The apparatus as recited in claim 1 wherein the mapping means comprises a means for determining the deviation indicators employing a function of the form:

$$DI = \lfloor K \times Abs(y - 0.5) \rfloor$$

wherein DI represents the deviation indicator, K represents a constant, Abs represents absolute values, y represents the value of the function, and "⌊ ⌋" represents a floor function that returns the largest integer value of an expression contained between the "⌊" and the "⌋" symbols.

9. An apparatus for monitoring variable environmental conditions comprising:
    a. transformation means for transforming each value of a plurality of environmental index values associated with the environment using a function dependent on at least baseline and critical values of the index value;
    b. mapping means for mapping the function to a sequence of reference values and generating a deviation indicator for each environmental index value;
    c. analysis means for analyzing the deviation indicators and generating an average deviation indicator; and d. a plurality of sensors operative to measure the environmental index.

10. The apparatus as recited in claim 9 further comprising a display means for displaying the average environmental index.

11. An apparatus for monitoring an environmental system in order to analyze any changes and/or deviations from a predetermined norm, said apparatus comprising:
   a. transformation means for transforming each value of a plurality of environmental index values associated with the environmental system using a function dependent on at least baseline and critical values of the environmental index value;
   b. mapping means for mapping the function to a sequence of reference values and generating a deviation indicator for each environmental index value; and
   c. analysis means for analyzing the deviation indicators and generating a system criticality indicator in order to analyze any changes and/or deviations from a predetermined norm.

12. The apparatus as recited in claim 11 wherein the analysis means generates the system criticality indicator employing a function of the form:

$$DI_{cri} = \frac{n_m}{n}(DI_{max} - DI_{avg}) + DI_{avg}$$

wherein $DI_{cri}$ represents the system criticality indicator, n represents the total number of measured values, $DI_{max}$ represents a maximum deviation indicator for all the measured values, $DI_{avg}$ represents an average of the deviation indicators for all the measured values, $n_m$ is the total number of values with a deviation indicator equal to $DI_{max}$.

13. The apparatus as recited in claim 11 wherein the transformation means employs a function which exhibits a maximum sensitivity for deviations close to the baseline value of the environmental index value.

14. The apparatus as recited in claim 13 wherein the transformation means employs a function of the form:

$$y = \frac{1}{1 + e^{-G(x-BL)}}$$

$$y = \tanh(x)$$

$$y = \frac{X}{(1 + X)}$$

$$y = \begin{cases} ax + b\sin w & |x| > |bw| \\ y_m & x > x_{max} \end{cases}$$

wherein x represents the value of the particular environmental index; BL represents the baseline value for the environmental index; $x_{max}$ represents a predefined maximum value for the environmental index; a, b, and w represent predefined numbers; and y represents the value of the function, and $Y_m$ represents a predefined maximum value of the function.

15. The apparatus as recited in claim 10 wherein the transformation means employs a function which exhibits a minimum sensitivity for deviations close to the baseline value of the environmental index value.

16. The apparatus as recited in claim 15 wherein the transformation means employs a function of the form:

$$y = \tfrac{1}{2}\{1 - \exp(-G(x-BL)^2)\}$$

wherein y represents the mapped value of the parameter, x represents the measured value of the parameter, BL represents the baseline value for the parameter, and G represents the mapping parameter such that $$G_{low} = \frac{-\ln(1 - 2y')}{(x_{min} - BL)^2} \text{ for } x < BL$$

and $$G_{high} = \frac{-\ln(1 - 2y'')}{(x_{max} - BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

17. The apparatus as recited in claim 10 wherein the transformation means employs a non-linear transformation function.

18. The apparatus as recited in claim 10 wherein the mapping means comprises a means for determining the deviation indicators employing a function of the form:

$$DI = \lfloor K \times Abs(y - 0.5) \rfloor$$

wherein DI represents the deviation indicator, K represents a constant, Abs represents absolute values, y represents the value of the function, and "$\lfloor \, \rfloor$" represents a floor function that returns the largest integer value of an expression contained between the "$\lfloor$" and the "$\rfloor$" symbols.

19. The apparatus as recited in claim 10 further comprising a plurality of sensors operative to measure the environmental index values.

20. The apparatus as recited in claim 10 further comprising a display means for displaying the system criticality indicator.

21. An apparatus for monitoring an environmental system in order to analyze any changes and/or deviations from a predetermined norm, said apparatus comprising:
   a. transformation means for transforming each value of a plurality of environmental indices associated with the system using a function dependent on at least baseline and critical values of the environmental index value, wherein the function exhibits a maximum sensitivity for deviations close to the baseline value of the environmental index value; and
   b. mapping means for mapping the function to a sequence of reference values and generating a deviation indicator for each environmental index value in order to analyze any changes and/or deviations from a predetermined norm.

22. The apparatus as recited in claim 21 wherein the transformation means employs a function of the form:

$$y = \frac{1}{1 + e^{-G(x-BL)}}$$

$$y = \tanh(x)$$

$$y = \frac{X}{(1 + X)}$$

$$y = \begin{cases} ax + b\sin w & |x| > |bw| \\ y_m & x > x_{max} \end{cases}$$

wherein x represents the value of the particular environmental index; BL represents the baseline value for the environmental index; $x_{max}$ represents a predefined maximum value for the environmental index; a, b, and w represent predefined numbers; and y represents the value of the function, and $Y_m$ represents a predefined maximum value of the function.

23. The apparatus as recited in claim 21 wherein the transformation means employs a function which exhibits a minimum sensitivity for deviations close to the baseline value of the environmental index value.

24. The apparatus as recited in claim 23 wherein the transformation means employs a function of the form:

$$y=\tfrac{1}{2}\{1-\exp(-G(x-BL)^2)\},$$

wherein y represents the mapped value of the parameter, x represents the measured value of the parameter, BL represents the baseline value for the environmental parameter, and G represents the mapping parameter such that $$G_{low} = \frac{-\ln(1-2y')}{(x_{min}-BL)^2} \text{ for } x < BL$$

and $$G_{high} = \frac{-\ln(1-2y'')}{(x_{max}-BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

25. The apparatus as recited in claim 21 wherein the mapping means comprises a means for determining the deviation indicators employing a function of the form:

$$DI=\lfloor K \times Abs(y-0.5) \rfloor$$

wherein DI represents the deviation indicator, K represents a constant, Abs represents absolute values, y represents the value of the function, and "$\lfloor \, \rfloor$" represents a floor function that returns the largest integer value of an expression contained between the "$\lfloor$" and the "$\rfloor$" symbols.

26. An apparatus for monitoring an environmental system comprising:

a. transformation means for transforming each value of a plurality of environmental indices associated with the system using a function dependent on at least baseline and critical values of the environmental index value, wherein the function exhibits a maximum sensitivity for deviations close to the baseline value of the environmental index value;

b. mapping means for mapping the function to a sequence of reference values and generating a deviation indicator for each environmental index value; and c. a plurality of sensors operative to measure the values of the environmental index values.

27. An apparatus for monitoring an environmental system in order to analyze any changes and/or deviations from a predetermined norm, said apparatus comprising:

a. transformation means for transforming each value of a plurality of environmental index values associated with the system using a function dependent on at least baseline values of the environmental system; and b. mapping means for mapping the function to a sequence of reference values and generating a deviation indicator for each environmental index value in order to analyze any changes and/or deviations from a predetermined norm.

* * * * *